United States Patent [19]

Moriya

[11] Patent Number: 5,048,114
[45] Date of Patent: Sep. 10, 1991

[54] IMAGE READING AND PROCESSING APPARATUS RESPONSIVE TO ATTRIBUTES FOR DESIGNATING COPYING CONDITIONS

[75] Inventor: Shigeru Moriya, Osaka, Japan

[73] Assignee: Minolta Camera Kabushiki Kaisha, Osaka, Japan

[21] Appl. No.: 296,798

[22] Filed: Jan. 12, 1989

[30] Foreign Application Priority Data

| Jan. 14, 1988 | [JP] | Japan | 63-7281 |
| Mar. 3, 1988 | [JP] | Japan | 63-50946 |
| Mar. 3, 1988 | [JP] | Japan | 63-50947 |

[51] Int. Cl.⁵ ............................................. G06K 9/20
[52] U.S. Cl. ...................................... 382/61; 382/47; 358/451
[58] Field of Search ............... 382/41, 47, 58, 61; 358/451

[56] References Cited

U.S. PATENT DOCUMENTS

| 4,751,376 | 6/1988 | Sugiura et al. | 250/201 |
| 4,763,200 | 8/1988 | Nakatani et al. | 358/282 |
| 4,811,416 | 3/1989 | Nakamura | 382/61 |
| 4,893,258 | 1/1990 | Sakuragi | 382/47 |
| 4,912,567 | 3/1990 | Nakajima et al. | 358/451 |
| 4,920,571 | 4/1990 | Abe et al. | 358/451 |

Primary Examiner—David K. Moore
Assistant Examiner—Jose L. Couso
Attorney, Agent, or Firm—Joseph W. Price

[57] ABSTRACT

An image reading and processing apparatus in which an image-carrying medium is scanned along a predetermined path in a line-by-line manner and, during each cycle of line scanning, image data is produced from a line of pixels on the scanned image-carrying medium and is stored into image data memories for each line of pixels on the image-carrying medium while data-write and data-read address signals are generated by first and second address generators and are supplied independently of each other to the image data memories, the second address generator being operative to supply the data-read address signal to the image data memories at a timing regulated on the basis of a signal indicative of a magnification/reduction ratio at which an image on an image-carrying medium is to be reproduced, wherein there are further provided an attribute data storage memory having a plurality of memory spaces respectively corresponding to a plurality of scanning areas, each memory space storing attribute data designating the conditions in which the image is to be reproduced, the attribute data storage memory being responsive to an attribute data address signal for outputting the attribute data corresponding to the attribute data address signals, wherein the image data output from the image data memory is processed on the basis of the attribute data output from the attribute data storage memory, and either the data-read address or the data-write address signal is supplied to the attribute data storage memory as the attribute data address signal.

14 Claims, 8 Drawing Sheets

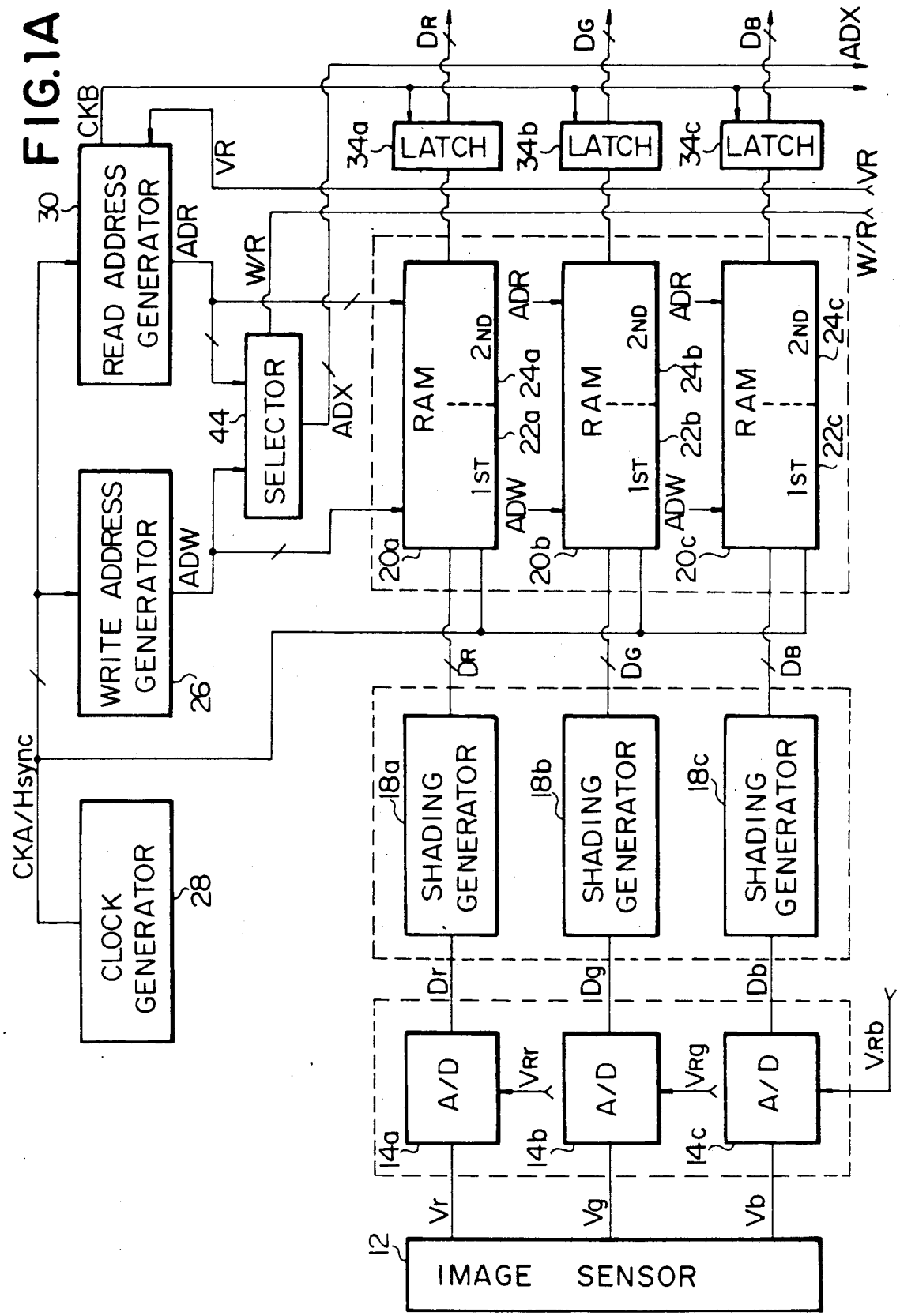

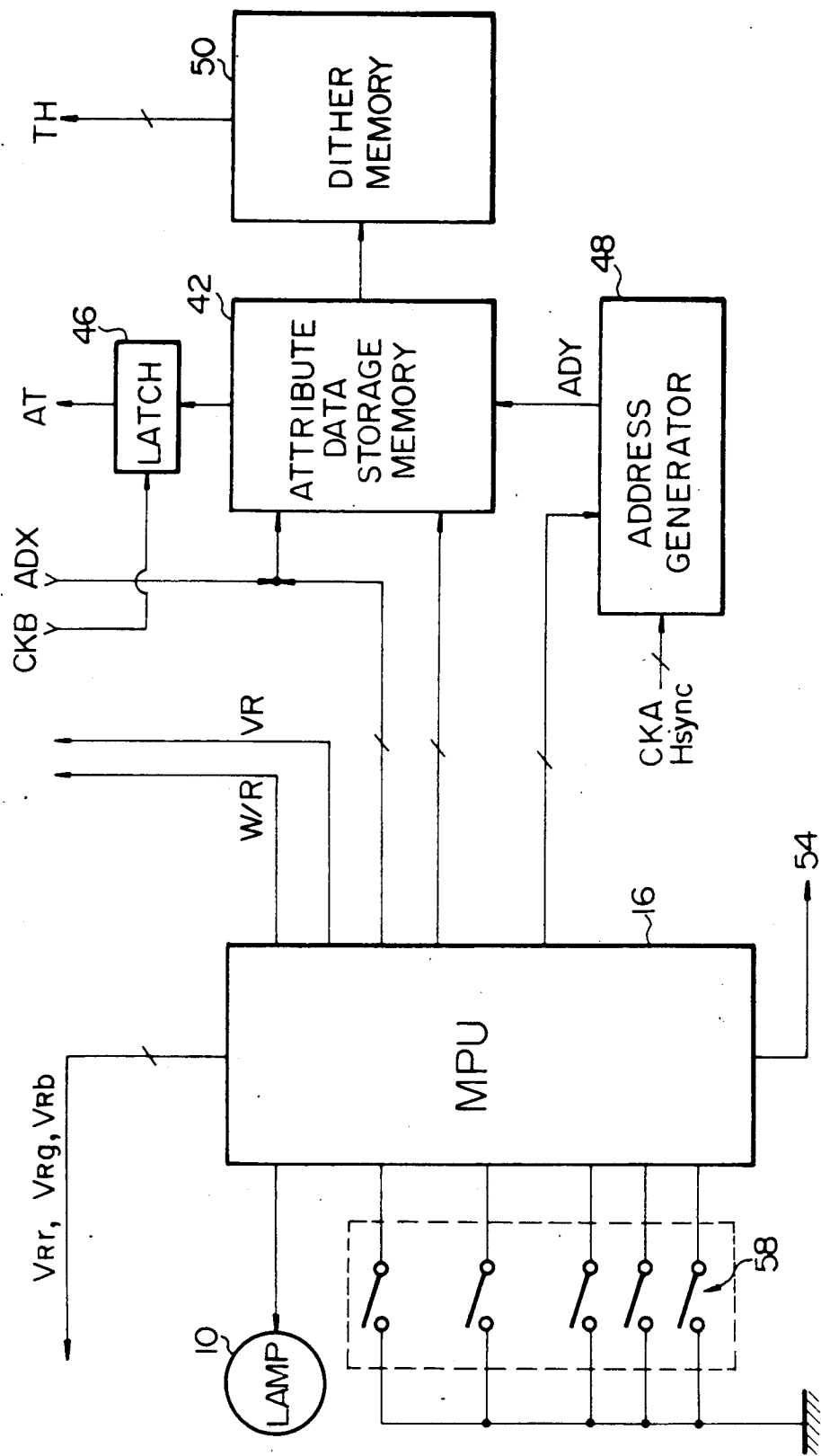

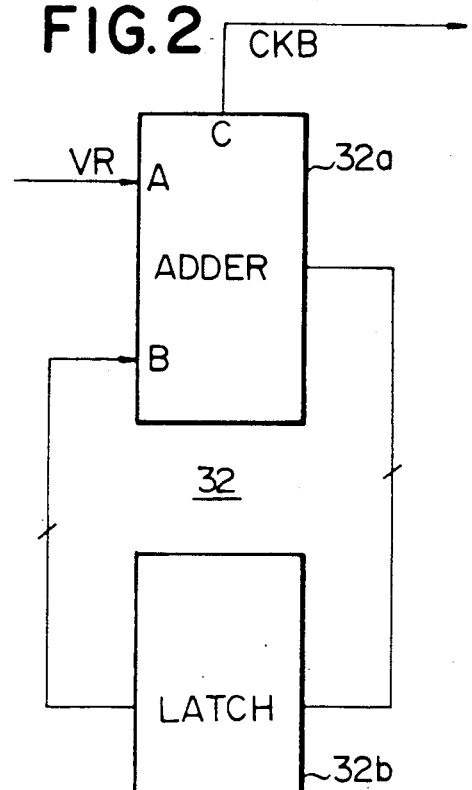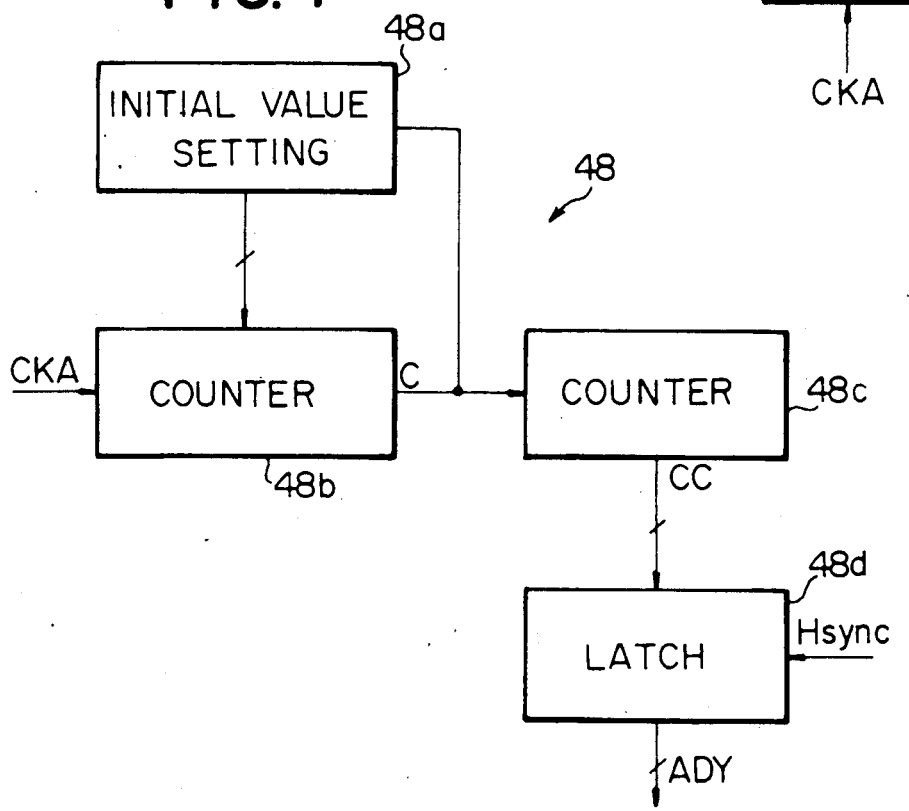

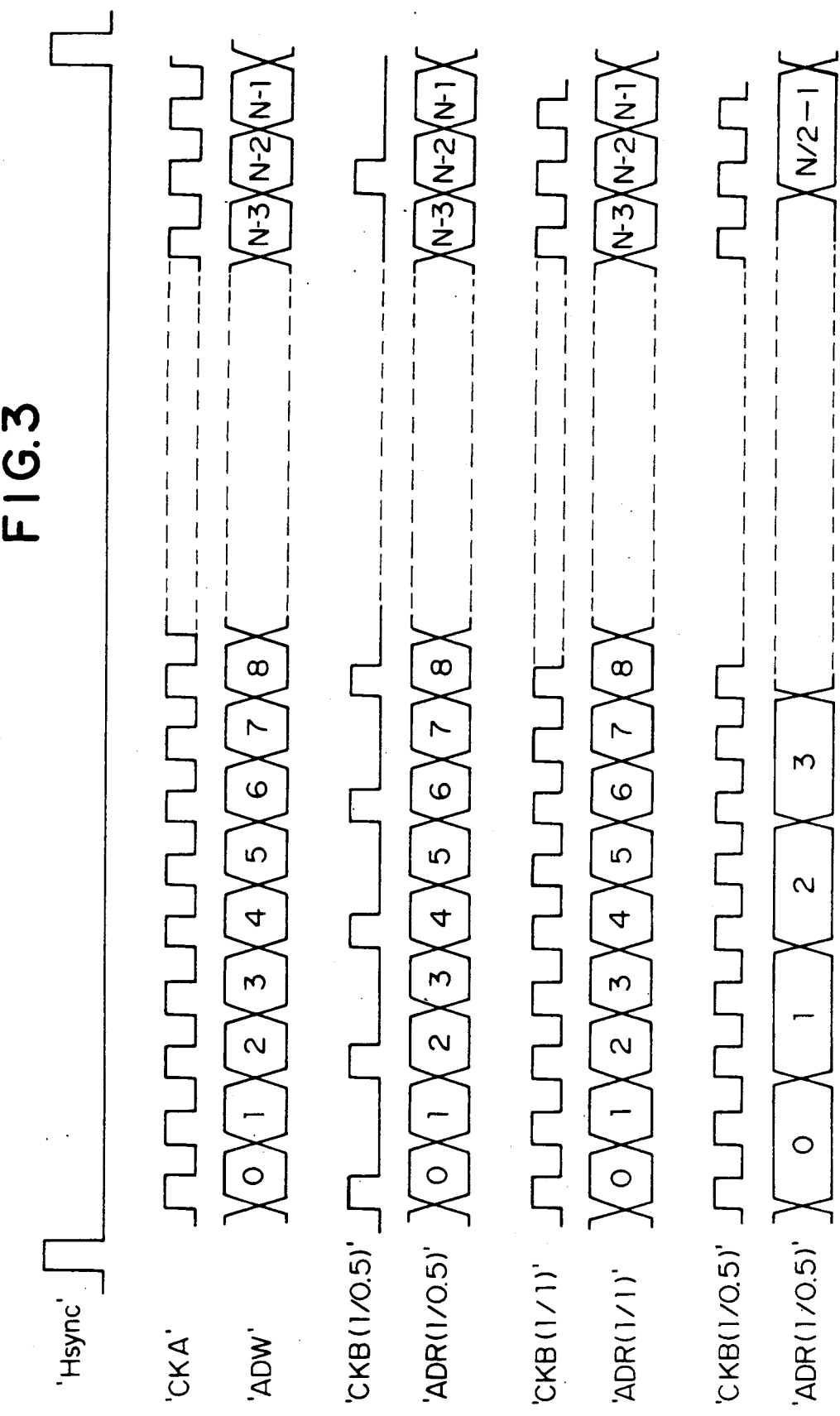

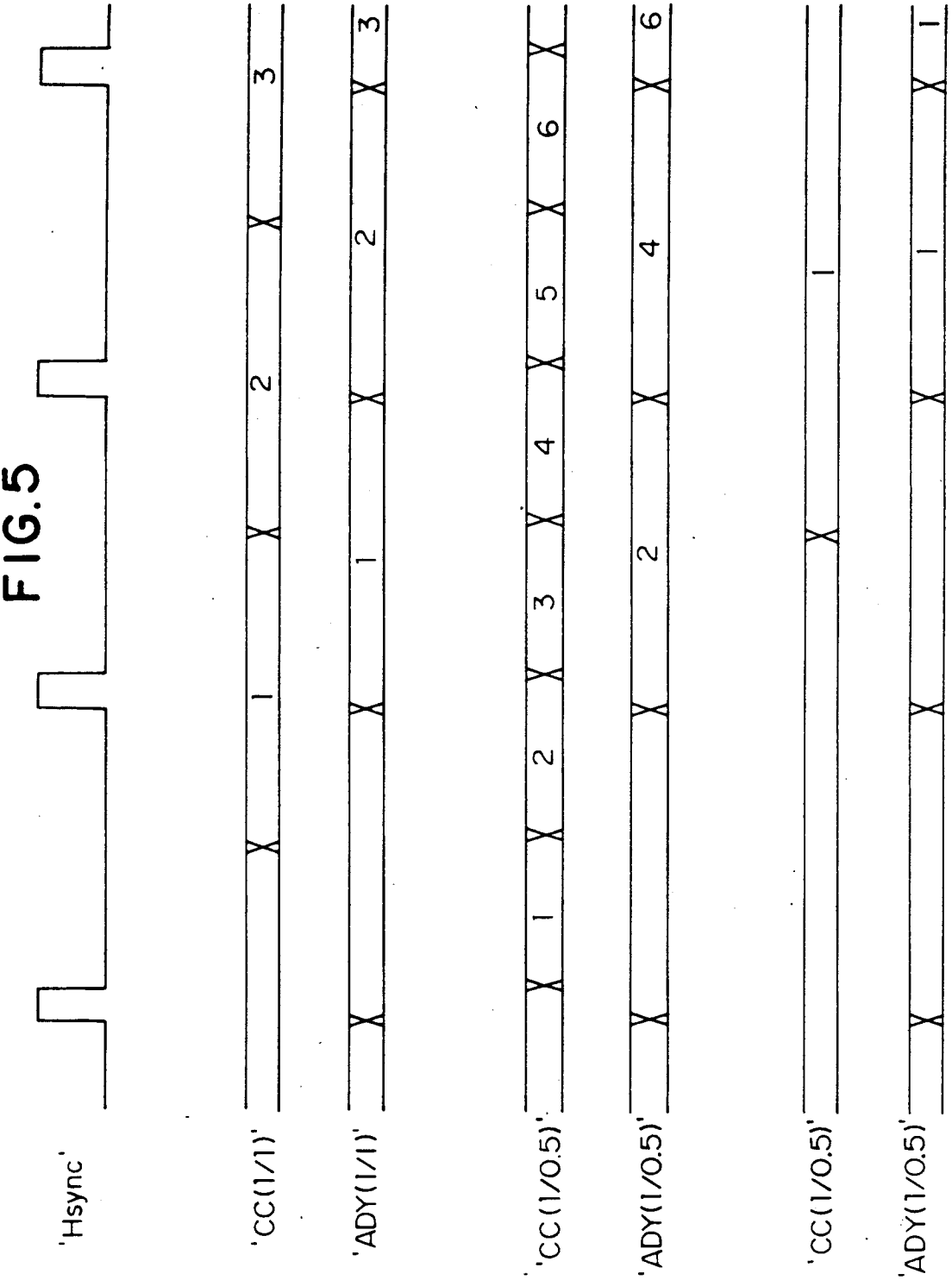

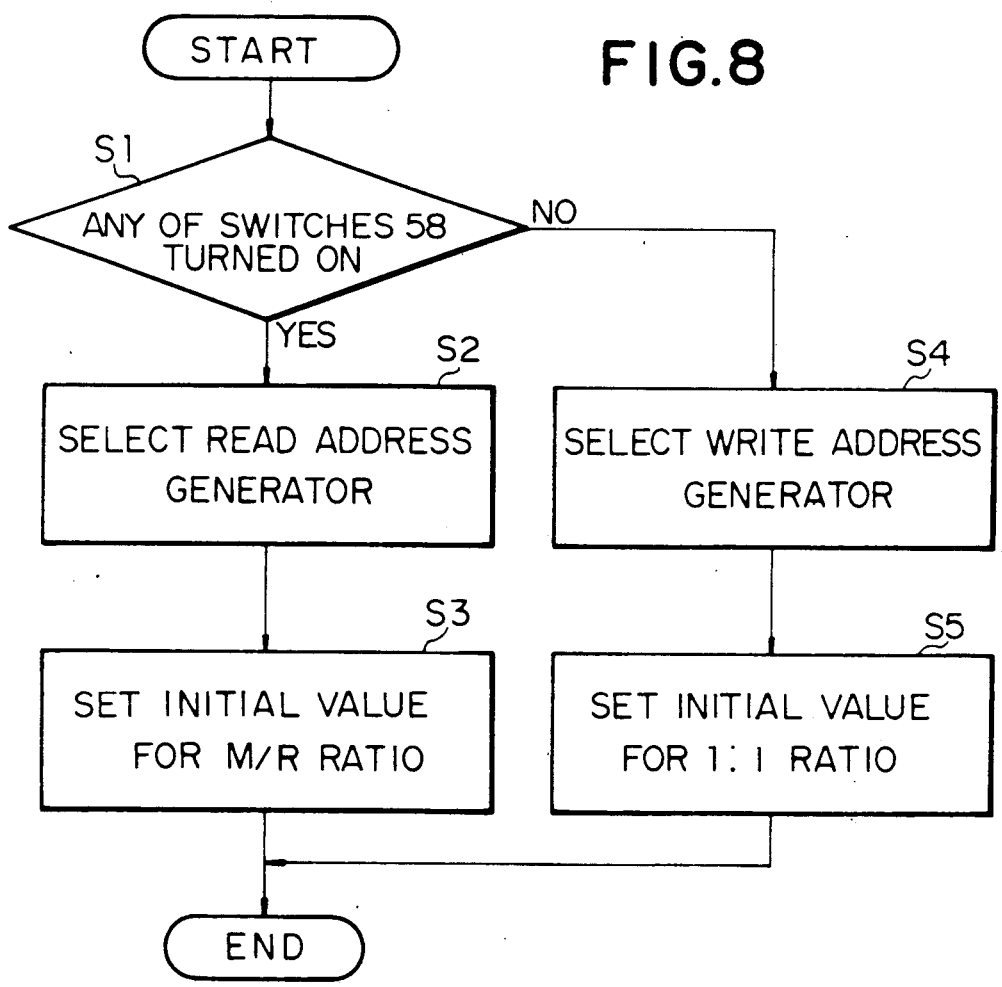

IMAGE READING AND PROCESSING APPARATUS RESPONSIVE TO ATTRIBUTES FOR DESIGNATING COPYING CONDITIONS

FIELD OF THE INVENTION

The present invention relates to an image reading and processing apparatus such as typically a digital color printer and, more particularly, to an image reading and processing apparatus in which images can be reproduced under conditions selected on the basis of "attribute" data representative of the various conditions in which images are to be duplicated or otherwise reproduced from a given original image-carrying medium.

BACKGROUND OF THE INVENTION

There is known and in use a digital printer of the type in which a fraction of the data generated through scanning of an original image can be disabled or inhibited from being output for actual use in reproducing the original image or the dark and light portions of the original image can be inverted to produce a blanked-out image area of a print sheet. These functions of the digital printer are executed on the basis of data stored in an image data storage memory capable of storing image data for the total area of a single page of image-carrying medium.

Thus, an image reading and processing apparatus of the described type has a problem in that the apparatus is required to use a memory device having such a large data storage capacity. An expedient useful for eliminating such a problem will be to use an "attribute" data storage memory for storing the characteristic conditions in which an original image is to be reproduced. An attribute data storage memory of this nature still has a drawback in that the attribute data stored in the memory is prepared on the basis of the image data for a specific magnification/reduction ratio for image reproduction and for this reason, one set of attribute data is required for the reproduction of an image at one magnification/reduction ratio and another set of attribute data is required for the reproduction of the same image at another magnification/reduction ratio.

SUMMARY OF THE INVENTION

Accordingly, it is an important object of the present invention to provide an image reading and processing apparatus in which the attribute data prepared for a particular magnification/reduction ratio can be used for the reproduction at different magnification/reduction ratios.

It is another important object of the present invention to provide an image reading and processing apparatus having an image reading and processing apparatus in which the attribute data once stored into an attribute data storage memory can be used without any modification for the reproduction of an image at any desired magnification/reduction ratio.

In accordance with a first outstanding aspect of the present invention, there is provided an image reading and processing apparatus comprising (a) image data generating means which is operative to optically scan an original image-carrying medium along a predetermined path in a line-by-line manner and, during each cycle of line scanning, generate image data from a line of pixels on the scanned image-carrying medium, (b) means for generating a first address signal and a second address signal, (c) image data memory means for storing the image data for each line of pixels on the scanned image-carrying medium, the image data memory means being responsive to the first address signal for outputting the image data stored therein, (d) an attribute data storage memory having a plurality of addressible memory spaces respectively corresponding to a plurality of scanning areas into which the coverage of the image data generating means is divided, each of the memory spaces having stored therein attribute data designating the conditions in which the image on the image-carrying medium is to be reproduced, the attribute data storage memory being responsive to the second address signal for outputting the attribute data corresponding to the second address signal, (e) data processing means for processing the image data output from the image data memory, the data processing means being operative to process the image data on the basis of the attribute data output from the attribute data storage memory, (f) means for generating a magnification/reduction-ratio signal indicative of a magnification/reduction ratio at which an image on an image-carrying medium is to be reproduced, (g) first timing regulating means responsive to the magnification/reduction-ratio signal for regulating the timings at which the first address signal is to be generated, (h) second timing regulating means responsive to the magnification/reduction-ratio signal for regulating the timings at which the second address signal is to be generated, and (i) control means for controlling each of the first and second timing regulating means.

An image reading and processing apparatus thus constructed and arranged in accordance with the first outstanding aspect of the present invention may further comprise j) means for determining whether both of the first and second timing regulating means are to be operative or only the first regulating means is to be operative with the second regulating means held inoperative.

In accordance with a second outstanding aspect of the present invention, there is provided an image reading and processing apparatus comprising (a) image data generating means which is operative to optically scan an original image-carrying medium along a predetermined path in a line-by-line manner and, during each cycle of line scanning, generate image data from a line of pixels on the scanned image-carrying medium, (b) image data memory means for storing the image data for each line of pixels on the scanned image-carrying medium and outputting the image data stored therein, (c) a first address generator for supplying a data-write address signal to the image data memory means, (d) a second address generator for supplying a data-read address signal to the image data memory means, the second address generator being operative to supply the data-read address signal to the image data memory means at a timing regulated on the basis of data indicative of a magnification/reduction ratio at which an image on an image-carrying medium is to be reproduced, (e) an attribute data storage memory having a plurality of addressible memory spaces respectively corresponding to a plurality of scanning areas into which the coverage of the image data generating means is divided, each of the memory spaces having stored therein attribute data designating the conditions in which the image on the image-carrying medium is to be reproduced, the attribute data storage memory being responsive to an attribute data address signal for outputting the attribute data corresponding to the attribute data address signals, (f) data processing means for processing the image data output from the image data memory, the data processing means being operative to process the image data on the basis of the attribute data output from the attribute data storage memory, and (g) attribute data address supply means for supplying the data-read address signal to the attribute data storage memory as the attribute data address signal.

In an image reading and processing apparatus thus constructed and arranged in accordance with the second outstanding aspect of the present invention, the attribute data address supply means may be operative to supply each of the data-write address signal and the data-read address signal to the attribute data storage memory as the attribute data address signal.

BRIEF DESCRIPTION OF THE DRAWINGS

The features and advantages of an image reading and processing apparatus according to the present invention will be more clearly appreciated from the following description taken in conjunction with the accompanying drawings in which:

FIGS. 1A, 1B and 1C are block diagrams showing the general construction and arrangement of the signal processing system of an image reading and processing apparatus embodying the present invention;

FIG. 2 is a block diagram showing the circuit arrangement of a latch timing generator network which forms part of a data-read address generator included in the signal processing system illustrated in FIGS. 1A to 1C;

FIG. 3 is a timing chart showing the timings at which data-write and data-read address signals and latch timing clock pulses are to be generated responsive to system clock pulses and horizontal scan synchronizing pulses used in the signal processing system illustrated in FIGS. 1A to 1C;

FIG. 4 is a block diagram showing the circuit arrangement of a "Y" data-read address generator provided in the signal processing system illustrated in FIGS. 1A to 1C;

FIG. 5 is a timing chart showing the timings at which a "Y" data-read address signal is to be generated responsive to the horizontal scan synchroniszng pulses used in the signal processing system illustrated in FIGS. 1A to 1C;

FIG. 8 is a flowchart showing an example of a routine program to be executed by the microprocessor incorporated in the signal processing system illustrated in FIGS. 1A to 1C when an image is to be reproduced with a magnification or reduction ratio.

DESCRIPTION OF THE PREFERRED EMBODIMENT

An image reading and processing apparatus according to the present invention may be provided in any of various forms and may thus be implemented in an image duplicating apparatus, a microfilm reader/printer apparatus or a digital printer apparatus. In which form an image reading and processing apparatus according to the present invention may be provided, there is used an original image-carrying medium which may be a printed or otherwise image-carrying document or a microfilm strip or fiche carrying an image frame of a series of image frames. Such an image reading and processing apparatus ordinarily comprises image data generating means which is operative to optically scan the original image-carrying medium along a predetermined path in a line-by-line manner and, during each cycle of line scanning, generate image data from a line of pixels on the scanned image-carrying medium.

Figure 1C:
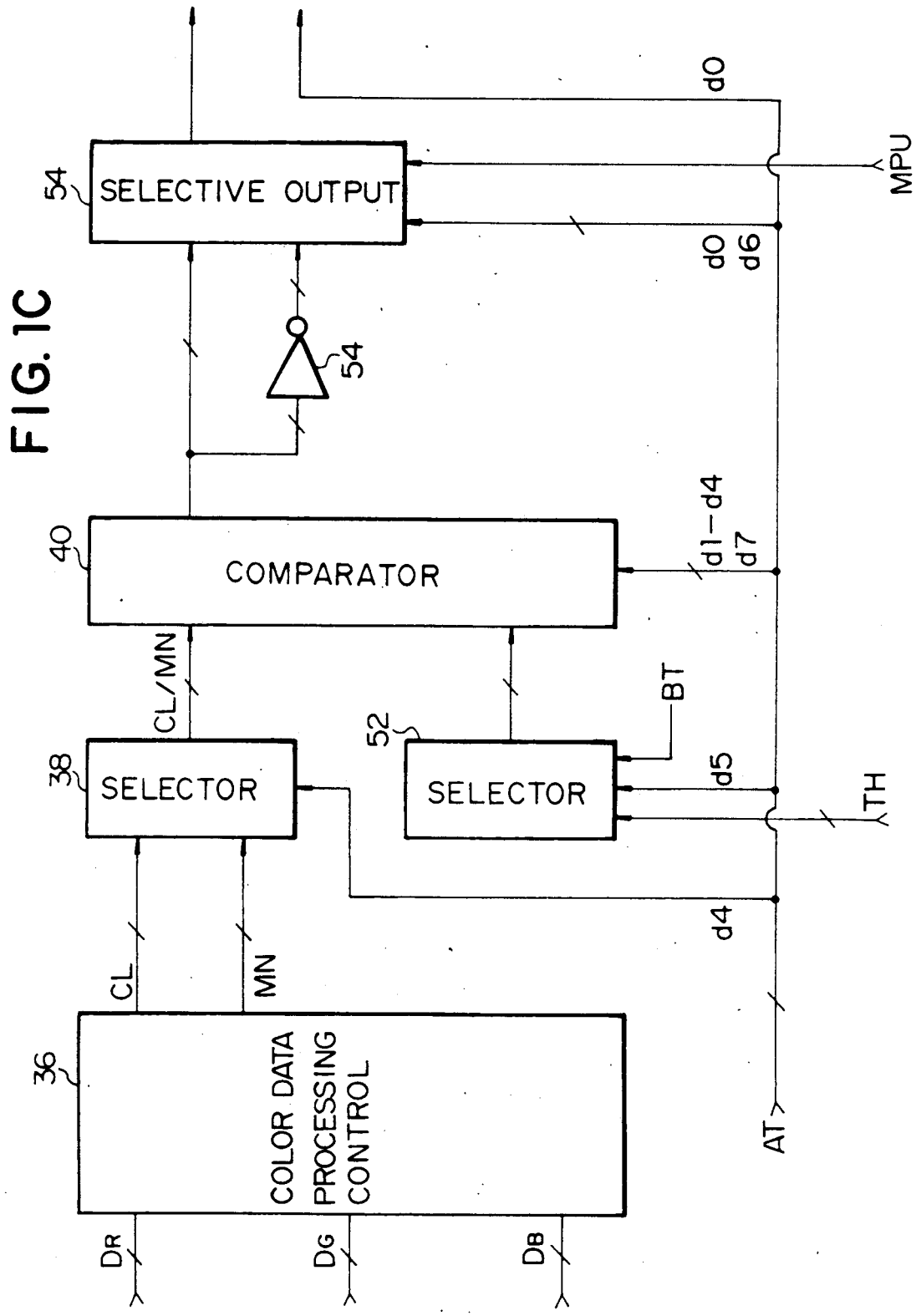

FIGS. 1A, 1B and 1C show a signal processing system of a colored image reading and processing apparatus embodying the present invention. The colored image reading and processing apparatus is used to read images on an original image-carrying medium (not shown) bearing multi-colored images thereon and the image data generating means of the apparatus comprises a source of light which is typically implemented by a white-light illuminating lamp schematically indicated at 10 in FIG. 1B. The original image-carrying medium is held in a predetermined position with respect to the illuminating lamp 10 and is irradiated with a beam of light emanating from the lamp 10. The beam of light incident on the image-carrying medium is reflected therefrom and the resultant beam of light bearing the images picked up from the image-carrying medium is directed to an image sensor 12 which is also held in a predetermined position with respect to the image-carrying medium. The image sensor 12 is typically implemented by three linear arrays of charge-coupled devices (CCD's) arranged in parallel with each other. The three linear arrays of charge-coupled devices are provided in combination with color filter elements for red, green and blue, respectively. The direction in which the charge-coupled devices are arranged in an array is herein referred to as primary or "horizontal" image scanning direction in the apparatus embodying the present invention.

At least one of the image-carrying medium and the illuminating lamp 10 is driven to travel with respect to the other in a direction perpendicular to the horizontal image scanning direction so that image data is to be produced for one line of pixels after another on the image-carrying medium. The direction in which the successive lines of pixels on the image-carrying medium are to be scanned is herein referred to as a secondary or "vertical" image scanning direction in the apparatus embodying the present invention. A device operative to scan an image-carrying medium in these horizontal and vertical image scanning directions is per se well known in the art from, for example, U.S. Pat. No. 4,751,376.

Activated by the incident information-carrying beam, the image sensor 12 produces light intensity signals $V_r$, $V_g$ and $V_b$ of voltage levels representing the intensities of light of the red, green and blue components, respectively, of the light which has passed through the color filter elements. These voltage signals $V_r$, $V_g$ and $V_b$ are supplied to a signal processing system comprising first, second and third analog-to-digital converters 14a, 14b and 14c and are thereby converted into corresponding eight-bit digital signals $D_r$, $D_g$ and $D_b$, respectively. For this purpose, each of the analog-to-digital converters 14a, 14b and 14c samples the input voltage signal $V_r$, $V_g$ or $V_b$ at a predetermined frequency and cyclically produces digital output signals $D_r$, $D_g$ or $D_b$ each consisting of a sequence of eight "0" and "1" bits representative of a numerical value corresponding to the sampled voltage signal. To the analog-to-digital converters 14a, 14b and 14c are applied different reference voltages $VR_r$, $VR_g$ and $VR_b$, respectively, from a microprocessor 16 (MPU, FIG. 1B). These reference voltages $VR_r$, $VR_g$ and $VR_b$ are selected so that the digital output signal $D_r$, $D_g$ or $D_b$ produced by each of the analog-to-digital converters 14a, 14b and 14c represents a predetermined numerical value for the maximum value of the supplied voltage signal $V_r$, $V_g$ or $V_b$.

The digital light intensity signals $D_r$, $D_g$ and $D_b$ thus output from the analog-to-digital converters 14a, 14b and 14c are supplied through parallel signal lines to first, second and third shading generator circuits 18a, 18b and 18c, respectively, each of which is operative to compensate for the spurious response components which may be contained in the input signal $D_r$, $D_g$ or $D_b$. The corrected digital light intensity signals, now denoted $D_R$, $D_G$ and $D_B$, are transferred to first, second and third magnification/reduction line memories 20a, 20b and 20c, respectively, which implement image data storage means of an image reading and processing apparatus according to the present invention. On the other hand, the illuminating lamp 10, image sensor 12, analog-to-digital converters 14a, 14b and 14c, and shading generator circuits 18a, 18b and 18c implement image data ratus according to the present invention. Each of the magnification/reduction line memories 20a, 20b and 20c typically consists of a random-access memory (RAM).

Each of the magnification/reduction line memories 20a, 20b and 20c has independently addressable first and second memory sections such as first and second memory sections 22a and 24a forming the first magnification/reduction line memory 20a, first and second memory sections 22b and 24b forming the second magnification/reduction line memory 20b, and first and second memory sections 22c and 24c forming the third magnification/reduction line memory 20c. Each of these memory sections of the magnification/reduction line memories 20a, 20b and 20c has a storage capacity for storing a plurality of bit sequences each representing a numerical value which may be represented by the digital light intensity signal $D_R$, $D_G$ and $D_B$. Each of the magnification/reduction line memories 20a, 20b and 20c has data-write address input terminals connected to a data-write address generator intensity signal $D_R$, $D_G$ and $D_B$ is written into any of the first and second memory sections 22a and 24a, 22b and 24b, or 22c and 24i c at an address designated by an address signal ADW supplied from the address generator 26. The data-write address generator 26 is responsive to clock pulses CKA supplied from a clock generator 28 and is enabled to generate a data-write address signal ADW each time a clock pulse CKA is received from the clock generator 28. The data-write address signal ADW thus output from the address generator 26 is incremented in response to the clock pulses CKA so that the data represented by the light intensity signals $D_R$, $D_G$ and $D_B$ are written into the first memory sections 22a, 22b and 22c of the magnification/reduction line memories 20a, 20b and 20c, respectively.

After the data represented by the light intensity signals $D_R$, $D_G$ and $D_B$ are thus written into the respective first memory sections of the magnification/reduction line memories, a horizontal scan synchronizing pulse $H_{sync}$ is output from the clock generator 28. In response to this horizontal scan synchronizing pulse $H_{sync}$, each of the first memory sections 22a, 22b and 22c of the magnification/reduction line memories 20a, 20b and 20c is conditioned to operate in a data-read cycle and, in turn, the address signal ADW is supplied to each of the second memory sections 24a, 24b and 24c of the magnification/reduction line memories 20a, 20b and 20c. The data represented by the light intensity signals $D_R$, $D_G$ and $D_B$ output from the shading generator circuits 18a, 18b and 18c are now written into the second memory sections 24a, 24b and 24c of the magnification/reduction line memories 20a, 20b and 20c, respectively.

Each of the magnification/reduction line memories 20a, 20b and 20c has further data-read address input terminals connected to a data-read address generator 30 which is also responsive to the clock pulses CKA supplied from the clock generator 28 and which is thus enabled to generate an address signal ADR each time a clock pulse CKA is received from the clock generator 28. As the address signal ADW from the address generator 26 is incremented in response to the clock pulses CKA, the data represented by the light intensity signals $D_R$, $D_G$ and $D_B$ which have been written into the first memory sections 22a, 22b and 22c of the magnification/reduction line memories 20a, 20b and 20c, respectively, are read out from the memory sections 22a, 22b and 22c while data are being written into the second memory sections 24a, 24b and 24c. After the data represented by the light intensity signals $D_R$, $D_G$ and $D_B$ are all written into the second memory sections 24a, 24b and 24c of the magnification/reduction line memories 20a, 20b and 20c, respectively, the memory sections 24a, 24b and 24c are conditioned to operate in a data-read cycle and, in turn, the first memory sections 22a, 22b and 22c of the magnification/reduction line memories 20a, 20b and 20c are conditioned to operate in a data-write cycle. The data represented by the light intensity signals $D_R$, $D_G$ and $D_B$ are now written into the first memory sections 22a, 22b and 22c of the magnification/reduction line memories 20a, 20b and 20c, respectively, and concurrently the data which have been written into the second memory sections 24a, 24b and 24c of the magnification/reduction line memories 20a, 20b and 20c, respectively, are read out from the memory sections 24a, 24b and 24c.

In these manners, data-write and data-read modes of operation are established alternately in the first and second memory sections 22a and 24a, 22b and 24b or 22c and 24c of each of the magnification/reduction line memories 20a, 20b and 20c in response to a horizontal scan $H_{sync}$ from the clock generator 28. While, thus, the data represented by the light intensity signals $D_R$, $D_G$ and $D_B$ are being written into the first memory sections 22a, 22b and 22c or the second memory sections 24a, 24b and 24c of the magnification/reduction line memories 20a, 20b and 20c, respectively, the data which have been written into the second memory sections 24a, 24b and 24c or the first memory sections 22a, 22b and 22c, respectively, are read out.

The data-read address signal ADR generated by the data-read address generator 28 as above described may be incremented in cycles each corresponding to a predetermined number of clock pulses CKA when a magnification/reduction-ratio signal VR supplied from the microprocessor 16 is indicative of any magnification ratio. The data-read address generator 28 is further operative to generate latch timing clock pulses CKB in cycles which vary with the magnification/reduction-ratio signal VR from the microprocessor 16.

Referring temporarily to FIG. 2, the data-read address generator 30 to generate the data-read address signal ADR as above described has incorporated therein a latch timing generator network 32 which comprises an adder 32a and a latch circuit 32b which is operative to latch an output signal from the adder 32a in response to a clock pulse CKA from the clock generator 28 (FIG. 1A). The adder 32a has one input terminal "A" responsive to the magnification/reduction-ratio signal VR supplied from the microprocessor 16 and another input terminal "B" responsive to an output signal from the latch circuit 32b. The adder 32a further has a carry output terminal "C" from which is to be output latch timing clock pulses CKB.

Assume, now, that the magnification/reduction-ratio signal VR currently supplied to the adder 32a from the microprocessor 16 is indicative of a reduction ratio of, for example, 1:1/n and accordingly there is a signal N/n produced at one input terminal "A" of the adder 32a, wherein N is an integer larger than n and N/n is herein assumed to be equal to 5. In response to the first clock pulse CKA which the latch circuit thereafter receives from the clock generator 28, the latch circuit 32b latches therein the data representative of the numerical value "5" and supplies the data to the other input terminal "B" of the adder 32a. As a consequence, the adder 32a is responsive to the data representing the numerical value "5" at both of its input terminals "A" and "B" and generates data representative of the numerical value "10" as the sum of the two pieces of input data. This newly produced data representative of the numerical value "10" is transferred to and latched into the latch circuit 32b in response to the subsequent clock pulse CKA. In these manners, the adder 32a is enabled to output data incremented by "5" each time a clock pulse CKA is received by the latch circuit 32b. When a carry thereafter occurs in the adder 32a, a latch timing clock pulse CKB is generated and is output through the terminal "C" of the adder 32a.

Assume, on the other hand, that there is a signal N/n' produced at one input terminal "A" of the adder 32a on the basis of the magnification/reduction-ratio signal VR currently supplied to the adder 32a, wherein N/n' is now assumed to be equal to 2. In this instance, the adder 32a is enabled to output data incremented by "2" each time a clock pulse CKA is received by the latch circuit 32b so that carries occur in the adder 32a and accordingly the latch timing clock pulses CKB are generated in longer cycles than in the first case. This means that, if the numerical value by which the output signal from the adder 32a is to be incremented in response to the clock pulse CKA is specified for a prescribed magnification ratio such as typically the 1:1 magnification ratio, the latch timing clock pulses CKB can be output in cycles which are dictated by the magnification/reduction-ratio signal VR supplied from the microprocessor 16 to the adder 32a. The relationship between the latch timing clock pulses CKB and the data-read address signal ADR will be described later.

Turning back to FIGS. 1A, the latch timing clock pulses CKB generated by the data-read address generator 30 as hereinbefore described are supplied to a parallel combination of latch circuits 34a, 34b and 34c which are connected to the magnification/reduction line memories 20a, 20b and 20c, respectively. Each of these latch circuits 34a, 34b and 34c is responsive to a latch timing clock pulse CKB from the data-read address generator 30 and has latched therein the data released from the associated one of the magnification/reduction line memories 20a, 20b and 20c. The data thus latched in the latch circuits 34a, 34b and 34c and representative of the digital light-intensity signals $D_R$, $D_G$ and $D_B$, respectively, are then unlatched and supplied to a color data processing control circuit 36 illustrated in FIG. 1C.

The data represented by the digital light-intensity signals $D_R$, $D_G$ and $D_B$ which the color data processing control circuit 36 receives from the latch circuits 34a, 34b and 34c, respectively, is formulated in predetermined relationship to the data represented by the digital light-intensity signals $D_R$, $D_G$ and $D_B$ read out from the magnification/reduction line memories 20a, 20b and 20c, respectively, responsive to the address signal ADR from the data-read address generator 30. Description will be hereinafter made with reference to FIG. 3 in regard to such relationship between the data read out from the magnification/reduction line memories 20a, 20b and 20c and the data which the color data processing control circuit 36 actually receives from the latch circuits 34a, 34b and 34c.

FIG. 3 shows waveforms of the various pulses and signals which may be produced in the signal processing system hereinbefore described with reference to FIGS. 1A to 1C. The waveforms herein shown include waveforms "$H_{sync}$" and "CKA" of the horizontal scan synchronizing pulses $H_{sync}$ and clock pulses CKA, respectively, output from the clock generator 28, a waveform "ADW" of the data-write address signal ADW output from the data-write address generator 26, and waveforms which the latch timing clock pulses CKB and data-read address signal ADR output from the data-read address generator 30 may have responsive to the magnification/reduction-ratio signal VR indicative of different magnification/reduction ratios for image reproduction. Such waveforms of the latch timing clock pulses CKB and data-read address signal ADR include waveforms "CKB(1/0.5)" and "ADR(1/0.5)" of the clock pulses CKB and address signal ADR produced when the magnification/reduction-ratio signal VR is indicative of a reduction ratio of 1:0.5, waveforms "CKB(1/1)" and "ADR(1/1)" of the clock pulses CKB and address signal ADR produced when the magnification/reduction-ratio signal VR is indicative of an equal-size reproduction ratio of 1:1, and waveforms "CKB(½)" and "ADR(½)" of the clock pulses CKB and address signal ADR produced when the magnification/reduction-ratio signal VR is indicative of a magnification ratio of 1:2.

When, now, a horizontal scan synchronizing pulse $H_{sync}$ is output from the clock generator 28 as indicated by the waveform "$H_{sync}$" in FIG. 3, each of the data-write address generator 26 and data-read address generator 30 is reset responsive to the synchronizing pulse $H_{sync}$. After the data-write and data-read address generators 26 and 30 are thus reset, the address generated in the data-write address generator 26 is incremented in response to the clock pulses CKA successively supplied from the clock generator 28. Accordingly, the data-write address signal ADW supplied from the address generator 26 to each of the magnification/reduction line memories 20a, 20b and 20c is also incremented responsive to the clock pulses CKA as indicated by the waveform "ADV" in FIG. 3.

On the other hand, the data-read address signal ADR output from the data-read address generator 30 is incremented under the control of the magnification/reduction-ratio signal VR supplied from the microprocessor 16. Thus, when the magnification/reduction-ratio signal VR is indicative of an equal-size reproduction ratio of 1:1 or any reduction ratio of, for example, 1:0.5, the data-read address signal ADR supplied from the data-read address generator 30 is incremented responsive to the clock pulses CKA as indicated by the waveform "ADR(1/1)" or waveform "ADR(1/0.5)" in FIG. 3. When the magnification/reduction-ratio signal VR is indicative of any magnification ratio of, for example, 1:2, the data-read address signal ADR from the address generator 30 is incremented in cycles each corresponding to a predetermined number of clock pulses CKA as will be seen from the waveform "ADR(½)" in FIG. 3. On the other hand, the latch timing clock pulses CKB are generated in synchronism with the clock pulses CKA as indicated by the waveform "CKB(1/1)" or waveform "CKB(½)" in FIG. 3 when the magnification/reduction-ratio signal VR is indicative of an equal-size reproduction ratio or any magnification ratio. When the magnification/reduction-ratio signal VR is indicative of a reduction ratio, the latch timing clock pulses CKB are generated in cycles which vary with the magnification/reduction-ratio signal VR supplied from the microprocessor 16 as will be seen from the waveform "CKB(1/0.5)" in FIG. 3.

Thus, when the magnification/reduction-ratio signal VR supplied from the microprocessor 16 is indicative of an equal-size reproduction ratio, the data stored in the magnification/reduction line memories 20a, 20b and 20c are read out at timings ("ADR(1/1)") synchronized with the clock pulses CKA and are supplied to the color data processing control circuit 36 by way of the latch circuits 34a, 34b and 34c, respectively. When the magnification/reduction-ratio signal VR supplied from the microprocessor 16 is indicative of any reduction ratio, the data stored in the magnification/reduction line memories 20a, 20b and 20c are also read out at timings ("ADR(1/0.5)") synchonized with the clock pulses CKA with the data-read address signal incremented in response to the clock pulses CKA. Under this condition, however, the latch timing clock pulses CKB are output from the data-read address generator 30 in cycles each corresponding to a predetermined number of clock pulses CKA as will be seen from the waveform "CKB(1/0.5)" in FIG. 3. As a consequence, the data output from the magnification/reduction line memories 20a, 20b and 20c are latched into the latch circuits 34a, 34b and 34c, respectively, in somewhat prolonged cycles dictated by the latch timing clock pulses CKB. This means that, when the magnification/reduction-ratio signal VR is indicative of a reduction ratio of, for example, 1:0.5, data for every second pixel of the colored image on an original image-carrying medium scanned in the horizontal image scanning direction is supplied to the color data processing control circuit 36 after temporarily latched in the latch circuits 34a, 34b and 34c. The result is that the image reproduced on a record medium such as a print sheet (not shown) has its size reduced to one half in the horizontal image scanning direction.

If, on the other hand, the magnification/reduction-ratio signal VR from the microprocessor 16 is indicative of a magnification ratio of, for example, 1:2, the data-read address signal ADR supplied from the data-read address generator 30 is incremented at a rate doubling the rate of increment for the equal-size reproduction ratio and maintains the same status for a period of time corresponding to two of the clock pulses CKA. The latch timing clock pulses CKB are under this condition output in synchronism with the clock pulses CKA and, for this reason, the data released from the 20a, 20b and 20c are latched twice into the latch circuits 34a, 34b and 34c, respectively. The result is that the image reproduced on a print sheet has its size two-fold enlarged in the horizontal image scanning direction.

It may be noted that the image to be reproduced can be magnified or reduced in the vertical image scanning direction with the image-carrying medium and image sensor 12 moved with respect to each other at a speed selected depending on the desired magnification or reduction ratio. For reproduction of the original image to a smaller scale, the image-carrying medium and image sensor 12 may be moved at the higher speed with respect to each other in the vertical image scanning direction. The horizontal scan synchronizing pulses $H_{sync}$ being generated at fixed intervals from the clock generator 28, the image sensor 12 is enabled to move the longer distance with respect to the image-carrying medium during a cycle of horizontal scanning operation. The printer head being driven to travel a fixed distance during each cycle of printing operation, there is a reduced version of original image produced with the image sensor 12 thus moved the longer distance with respect to the image-carrying medium.

For the purpose of reproducing the original image to a larger scale, the image-carrying medium and image sensor 12 may be moved at the lower speed with respect to each other in the vertical image scanning direction. With the horizontal scan synchronizing pulses $H_{sync}$ generated at fixed intervals from the clock generator 28, the image sensor 12 is now enabled to move the shorter distance with respect to the image-carrying medium during a cycle of horizontal scanning operation. The printer head being driven to travel a fixed distance during each cycle of printing operation, there is an enlarged version of original image produced with the image sensor 12 thus moved the shorter distance with respect to the image-carrying medium.

Turning back to FIGS. 1A to 1C, the color data processing control circuit 36 includes a masking circuit (not shown) through which the data representing the light intensity signals $D_R$, $D_G$ and $D_B$ supplied from the latch circuits 30a, 30b and 30c are referenced to produce a color-mode signal CL and a monochromatic-mode signal MN. The color-mode signal CL is indicative of the quantities of the cyanic-, magenta- and yellow-colored inks, respectively, to be actually used for the reproduction of the images represented by the supplied signals $D_R$, $D_G$ and $D_B$, respectively. The monochromatic-mode signal MN is indicative of either an arithmetic mean or a weighted mean of such quantities of the cyanic-, magenta- and yellow-colored inks. These color-mode signal CL and monochromatic-mode signal MN are supplied to a mode selector circuit 38 (FIG. 1C) which is operative to passing either the color mode signal CL or the monochromatic-mode signal MN to a comparator circuit 40. Whether the color-mode signals CL or the monochromatic-mode signal MN are to be passed to the comparator circuit 40 is determined on the basis of an attribute control signal AT supplied from an attribute data storage memory 42 (FIG. 1B). This attribute control signal AT output from the attribute data storage memory 42 is provided in the form of an eight-bit bit sequence indicative of any of the attributes of the printing or other image forming operation and is selectively fetched from the collection of data stored at the various addresses of the memory 42.

The attribute data storage memory 42 has addresses respectively corresponding to the minute segments of the total area of a image-carrying medium to be scanned, such segments being typically measuring 1 mm by 1 mm. At each of these addresses of the memory 42 is stored attribute data in the form of an eight-bit bit sequence loaded from the microprocessor 16. Any of these pieces of data stored in the attribute data storage memory 42 is accessed in response to an "X" data-read address signal ADX supplied from an write-read address selector circuit 44 (FIG. 1A). The attribute selector circuit 44 is responsive to the data-write address signal ADW supplied from the data-write address generator 26 and the data-read address signal ADR supplied from the data-read address generator 30 and selectively passes the address signal ADW or address signaL ADR to the attribute data storage memory 42 as the above mentioned "X" data-read address signal ADX for the memory 42. Whether the data-write address signal ADW from the address generator 26 or the data-read address signal ADR from the address generator 30 is to be passed to the attribute data storage memory 42 is determined on the basis of an instruction signal W/R from the microprocessor 16. In response to the "X" data-read address signal ADX which is thus provided selectively by the data-write address signal ADW from the address generator 26 or the data-read address signal ADR from the address generator 30, the attribute data storage memory 42 releases the attribute data stored at the address designated by the particular data-read address signal ADR. The attribute control signal AT thus output from the attribute data storage memory 42 is latched into a latch circuit 46 (FIG. 1B) in response to a latch timing clock pulse CKB supplied from the data-read address generator 30.

As has been described in connection with the latch circuits 30a, 30b and 30c, the data released from the magnification/reduction line memories 20a, 20b and 20c are latched in prolonged cycles into the latch circuits 30a, 30b and 30c, respectively, in the presence of a magnification/reduction-ratio signal VR indicative of any reduction ratio or a plurality of times into the latch circuits 30a, 30b and 30c in cycles synchronized with the clock pulses CKA in the presence of a magnification/reduction-ratio signal VR indicative of any magnification ratio. Similarly to the data thus stored into the latch circuits 30a, 30b and 30c, the attribute control signal AT output from the attribute data storage memory 42 is latched in prolonged cycles into the associated latch circuit 46 in the presence of a magnification/reduction-ratio signal VR indicative of any reduction ratio or a plurality of times into the latch circuit 46 in cycles synchronized with the clock pulses CKA in the presence of a magnification/reduction-ratio signal VR indicative of any magnification ratio. This means that the attribute data need not be modified for the reproduction of an original image to an enlarged or reduced scale. Because, in addition, of the fact that the pieces of attribute data stored in the attribute data storage memory 42 are provided in conjunction with the individual segments of the total area of the image-carrying medium to be reproduced, the number of the pieces of attribute data for a given image area is less than the number of the pieces of data representing the digital light intensity signals $D_R$, $D_G$ and $D_B$ For this reason, the above mentioned "X" data-read address signal ADX supplied from the attribute data storage memory 42 is provided simply by some high-order bits of the bit sequence forming the data-read address signal ADR supplied from the data-read address generator 30.

The attribute data storage memory 42 further receives a "Y" data-read address signal ADY from a "Y" address generator 48 (FIG. 1B). As illustrated in FIG. 4, this "Y" address generator 48 largely comprises an initial value setting circuit 48a, first and second counter circuits 48b and 48c, and a latch circuit 48d. In the initial value setting circuit 48a is to be set any initial numerical value by means of the microprocessor 16 depending on the selected magnification/reduction ratio. The first counter circuit 48b is operative to increment the initial numerical value set in the initial value setting circuit 48a each time a clock pulse CKA is received from the clock generator 28 and produce a ripple carry at its carry-out terminal "C". The second counter 48c is operative to increment the ripple carry thus produced in the first counter 48b and forms a signal CC representative of the numerical value thus incremented. The latch circuit 48d is responsive to a horizontal scan synchronizing pulse $H_{sync}$ from the clock generator 28 to latch the signal CC appearing at the output of the second counter 48c when the horizontal scan synchronizing pulse $H_{sync}$ is received and thereby provides an output as the "Y" data-read address signal ADY.

In the "Y" address generator 48 constructed in this fashion, the initial numerical value set up by the initial value setting circuit 48a is incremented by the first counter 48b each time a clock pulse CKA is received from the clock generator 28 and, when a ripple carry is generated at the carry-out terminal "C" of the counter 48b, another initial numerical value is set by the initial value setting circuit 48a and is successively incremented by the first counter 48b in response to the clock pulses CKA from the clock generator 28. Thus, the timings at which the content of the second counter 48c can be re-adjusted through modification of the initial numerical value to be set up by the initial value setting circuit 48a. Accordingly, the "Y" address represented by the "Y" data-read address signal ADY released from the latch circuit 48d of the "Y" address generator 48 and supplied to the attribute data storage memory 42 is incremented at a step of a plurality of addresses during reproduction of an image to a reduced scale. During reproduction of image to an enlarged scale, the "Y" data-read address signal ADY remains representative of the same address for a plurality of horizontal scan synchronizing pulses $H_{sync}$.

FIG. 5 is a timing chart showing the timings at which the "Y" data-read address signal ADY is to be generated from the "Y" address generator 48. The waveforms herein shown include, in addition to the waveform "$H_{sync}$" of the horizontal scan synchronizing pulses $H_{sync}$, the waveforms which the signal CC output from the second counter 48c and "Y" data-read address signal ADY output from the latch circuit 48d of the "Y" data-read address generator 48 may have for different magnification/reduction ratios for image reproduction. Such waveforms of the counter output signal CC and "Y" data-read address signal ADY include waveforms "CC(1/1)" and "ADY(1/1)" of the signals CC and ADY produced when the magnification/reduction-ratio signal VR is indicative of an equal-size reproduction ratio of 1:1, waveforms "CC(1/0.5)" and "ADY(2/1)" of the signals CC and ADY produced when the magnification/reduction-ratio signal VR is indicative of a reduction ratio of 1:0.5, and waveforms "CC(1/2)" and "ADY(½)" of the signals CC and ADY produced when the magnification/reduction-ratio signal VR is indicative of a reduction ratio of 1:2.

During reproduction of image to a reduced scale with a reduction ratio of, for example, 1:0.5, an initial numerical value larger than that set up for the reproduction of image with an equal size is established in the initial value setting circuit 48a of the address generator 48. Under this condition, the signal CC produced in the second counter 48c is incremented at a rate higher than that at which the signal CC is to be incremented during reproduction image with an equal size, as will be seen from comparison between the waveforms "CC(1/1)" and "CC(1/0.5)" shown in FIG. 5. Accordingly, the latch circuit 48d of the address generator 48 is enabled to latch the "Y" address signal ADY during every second cycle of incrementation in the counter 48c in response to the horizontal scan synchronizing pulse H$_{sync}$ as will be seen from the waveform "ADY(1/0.5)" shown in FIG. 5. As a consequence, attribute data are read out from the attribute data storage memory 42 at every second "Y" address of the memory 42 in reproducing an image with a reduction ratio of 1:0.5.

On the other hand, during reproduction of image to an enlarged scale with a magnification ratio of, for example, 1:2, an initial numerical value smaller than that set up for the reproduction of image with an equal size is established in the initial value setting circuit 48a of the address generator 48. Under this condition, the signal CC produced in the second counter 48c is incremented at a rate lower than that at which the signal CC is to be incremented during reproduction image with an equal size, as will be seen from comparison between the waveforms "CC(1/1)" and "CC(½)" shown in FIG. 5. The signal CC output from the second counter 48c of the address generator 48 remains unchanged for a plurality of horizontal scan synchronizing signals H$_{sync}$ and, accordingly, the latch circuit 48d of the address generator 48 is enabled to latch the signal CC incremented during a period of time having a plurality of horizontal scan synchronizing signals H$_{sync}$ received by the latch circuit 48d. Thus, data are read out twice from the attribute data storage memory 42 during reproduction of image to an enlarged scale with a magnification ratio and, as a consequence, the attribute data storage memory 42 is enabled to output the same data repeatedly for the enlarged reproduction of the original image, thus making it unnecessary to modify the attribute data for the enlarged reproduction of the original image.

Description will now be made in regard to the general nature of the attribute data stored in the attribute data storage memory 42.

Each of the pieces of data stored in the attribute data storage memory 42 is provided in the form of an eight-bit bit sequence composed of bits d0 to d7. The eighth bit d7 of such a bit sequence is indicative of the information to validate or invalidate the previously mentioned color-mode signal CL or monochromatic-mode signal MN and, when set to, for example, logic "0" state, invalidates the color-mode signal CL or monochromatic-mode signal MN and makes it possible to print the entire print area in a single color. The seventh bit d6 of the attribute data is indicative of the information requesting inversion of the instruction given by the color-mode signal CL or monochromatic-mode signal MN and, when set to logic "1" state, makes it possible to print image in colors complementary to those indicated by the color-mode signal CL or print out in an inverted monochromatic fashion. The sixth bit d5 of the attribute data is used to select either binary processing or dither processing of the signal output from the color data processing control circuit 36 and, when the dither processing mode is selected, the original image can be reproduced in half tones. The fifth bit d4 is effective to select either a color mode of printing operation or a monochromatic mode of printing operation and, in response to the bit d4 of, for example, logic "1", the mode selector circuit 38 determines to print an image in a monochromatic mode irrespective of the color-mode signal CI, or the monochromatic mode signal MN passed through the mode selector circuit 38 and validated by the eighth bit d7. The first bit d0 of the attribute data is effective for inhibition of either the color-mode signal CL or the monochromatic signal MN from being output from the system. Furthermore, the fourth, third and second bits d3, d2 and d1 of the attribute data form a color code designating any of the total of eight different colors which consist of white, yellow, magenta, red, cyan, green, blue and black. The following table indicates examples of the bit configuration of the color code for these eight different colors.

| Bit d3 | Bit d2 | Bit d1 | Colors |
| --- | --- | --- | --- |
| 0 | 0 | 0 | White |
| 0 | 0 | 1 | Yellow |
| 0 | 1 | 0 | Magenta |
| 0 | 1 | 1 | Red |
| 1 | 0 | 0 | Cyan |
| 1 | 0 | 1 | Green |
| 1 | 1 | 0 | Blue |
| 1 | 1 | 1 | Black |

The pieces of attribute data each of which is thus provided in the form of eight-bit bit sequences correspond to the individual minute segments of the image-carrying medium to be scanned and, for this reason, may be used for the masking of a desired area of the image on the image-carrying medium, trimming of the image area, printing in a single specified color or half-tone multiple-color printing. For example, a portion of an image area of an original image-carrying medium may be printed in colors and another portion in a single specified color, or an image on an original image-carrying medium may be printed in a color or colors different from the color or colors in which the image occurs in the original image-carrying medium, or a portion of the image area on an original image-carrying medium may be erased with the remaining portion of the area printed in any color or colors.

Turning back to FIGS. 1A to 1C, the signal processing system of the image reading and processing apparatus embodying the present invention further comprises a dither memory 50 implemented by a read-only memory and storing a collection of threshold values for the formation of dither processed signals. Data, TH, representative of any of the threshold values thus stored in the dither memory 50 is output to a threshold selector circuit 52 which is responsive to the attribute data supplied from the attribute data storage memory 42 through the latch circuit 46. In response to the sixth bit d5 of the attribute data output from the attribute data storage memory 42 and released from the latch circuit 46, the threshold selector circuit 52 passes to the comparator circuit 40 either the data TH representative of any of the threshold values thus stored in the dither memory 50 or data BT representative of a binary threshold value supplied from a source independent of the dither memory 50.

The comparator circuit 40 is thus responsive to either the color-mode signal CL or monochromatic-mode signal MN supplied through the mode selector circuit 38 and to either the data TH or data BT thus supplied through the threshold selector circuit 52. The comparator circuit 40 is further responsive to the second to fourth bits d1 to d5 and the eighth bit d7 of the attribute data supplied from the attribute data storage memory 42 through the latch circuit 46. If the color mode of printing operation is selected by the fifth bit d4 of the attribute data, the data represented by either the color-mode signal CL or the monochromatic-mode signal MN supplied through the mode selector circuit 38 are passed through the comparator circuit 40 without any modification. On the other hand, if the monochromatic mode of printing operation is selected by the fifth bit d4 of the attribute data, then the fifth bit d4 of the attribute data is substituted by the color code formed by the second to fourth bits d1 to d3 so that the original image is to be monochromatically reproduced in a color designated by the color code d1/d2/d3. In this instance, the data represented by either the color mode signal CL or the monochromatic-mode signal MN supplied through the mode selector circuit 38 is passed through the comparator circuit 40 without any modification. When the eighth bit d7 of the attribute data supplied from the attribute data storage memory 42 is in a logic state validating the color-mode signal CL or the monochromatic-mode signal MN, the information regarding the print densities as contained in the signal CL or signal MN passed through the mode selector circuit 38 is controlled in accordance with the threshold value represented by the data TH supplied from the threshold selector circuit 52.

The signal passed through the comparator circuit 40 is applied directly to one input terminal of a selective output circuit 54 and further through an inverter 56 to another input terminal of the selective output circuit 54. This selective output circuit 54 is responsive to the first bit d0 of the attribute data from the attribute data storage memory 42 and inhibits delivery of the output signal from the comparator circuit 40 and the inverted version thereof. The selective output circuit 54 is responsive to the seventh bit d6 of the attribute data from the attribute data storage memory 42 and transfers either the output signal from the comparator circuit 40 or the inverted version thereof to a driver circuit (not shown) for the print head of the apparatus. Represented by reference numeral 58 are selector switch elements which are to be used to determine a magnification/reduction ratio depending on the selected size of print sheets.

Operation of Signal Processing System

Operation of the image reading and processing apparatus, particularly, the signal processing system of the apparatus thus constructed and arranged in accordance with the present invention will be hereinafter described in regard to cases where the original image is to be printed with an equal-size reproduction ratio of 1:1, a reduction ratio of 1:0.5, and a magnification ratio of 1:2.

Figure 7:
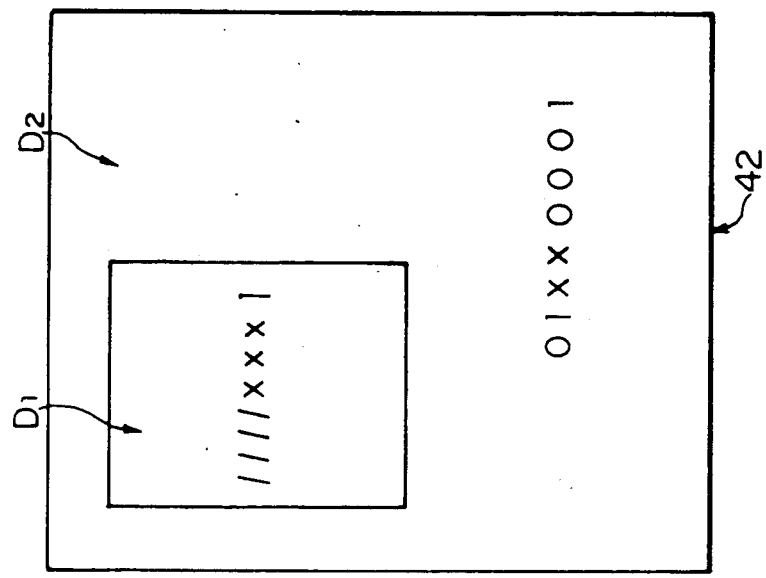
FIG. 7 is a view similar to FIG. 6 but shows an address map of an attribute data storage memory forming part of the signal processing system of the apparatus embodying the present invention.
Figure 6:
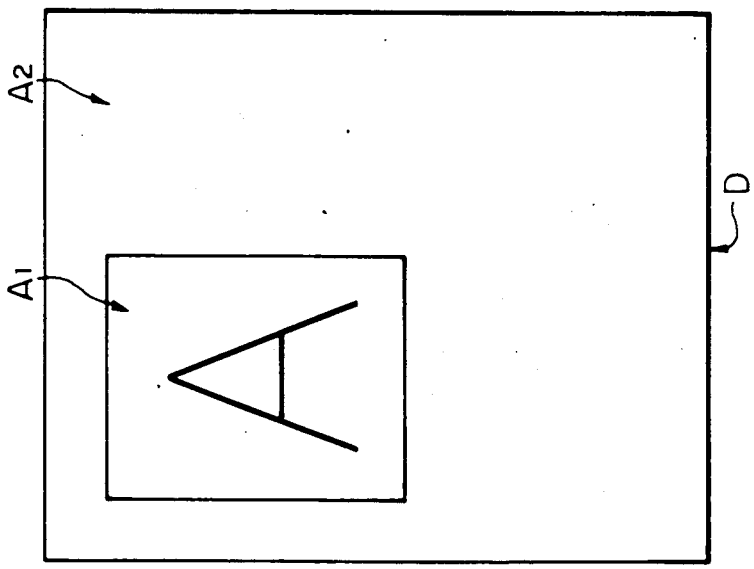
FIG. 6 is a plan view showing an example of an original image-carrying medium which may be duplicated in the apparatus embodying the present invention, the image-carrying medium shown having a multi-colored image area surrounded by a white background area.

For the purpose of description, it will be assumed that here is given an original image-carrying medium D having a multi-colored image area A1 surrounded by a white background area A2 as shown in FIG. 6. The attributes of the printing operation for these image and background areas A1 and A2 of the image-carrying medium D are to be specified depending on the particular areas A and A2 of the image-carrying medium D per se. For the image-carrying medium D having the image and background areas A and A2, the attribute data storage memory 42 has an address space D1 corresponding to the image area A1 and an address space D2 corresponding to the background area A . In the address space D1 of the attribute data storage memory 42 are assumed to be stored pieces of attribute data expressed in the forms of "1111xxx1" and in the address space D2 of the memory 42 are assumed to be stored pieces of attribute data expressed in the forms of "01xx0001" the background area A2, as shown in FIG. 7.

Reproduction with Equal-Size Reproduction Ratio

Assume first that the image-carrying medium D having the attribute data thus stored in the attribute data storage memory 42 is to be duplicated with an equal-size reproduction ratio of 1:1 in the apparatus embodying the present invention. The image-carrying medium D is held in a predetermined position with respect to the illuminating lamp 10 and is irradiated with a beam of light emanating from the lamp 10 and directed to the image-carrying medium D. The image sensor 12 is driven to stepwise travel in the vertical image scanning direction with respect to the image-carrying medium D to scan lines of pixels successively one after another.

The beam of light incident on the image-carrying medium is reflected from the image-carrying medium D and the resultant beam of light bearing the images picked up from the image-carrying medium D is directed to the image sensor 12. Activated by the incident information-carrying beam, the image sensor 12 produces the light intensity signals $V_r$, $V_g$ and $V_b$ of voltage levels representing the intensities of light of the red, green and blue components, respectively, of the light passed through the color filter elements. The voltage signals $V_r$, $V_g$ and $V_b$ are generated successively during successive cycles of scanning operation. These voltage signals $V_r$, $V_g$ and $V_b$ are supplied to the analog-to-digital converters 14a, 14b and 14c and the resultant eight-bit digital signals $D_r$, $D_g$ and $D_b$ are supplied through parallel signal lines to the first, second and third shading generator circuits 18a, 18b and 18c, respectively, to compensate for the spurious response components which may be contained in the input signals Dhd r, $D_g$ and $D_b$. The corrected digital light intensity signals $D_R$, $D_G$ and $D_B$ are transferred to the magnification/reduction line memories 20a, 20b and 20c, respectively, during each cycle of scanning operation and, as the image-carrying medium D is scanned in the vertical image scanning direction, the signal $D_R$, $D_G$ and $D_B$ is successively supplied to each of the magnification/reduction line memories 20a, 20b and 20c.

Each of the magnification/reduction line memories 20a, 20b and 20c is responsive to a horizontal scan synchronizing signal $H_{sync}$ and has alternately stored into the first 22a, 22b and 22c and second memory sections 24a, 24b and 24c the digital light intensity signals $D_R$, $D_G$ and $D_B$ containing information for a single line of pixels. Assume now that the digital light intensity signals $D_R$, $D_G$ and $D_B$ are stored into the first 22a, 22b and 22c in response to a horizontal scan synchronizing signal $H_{sync}$ and thereafter the first memory sections 22a, 22b and 22c are conditioned to operate in a data-read cycle and the second memory sections 24a, 24b and 24c conditioned to operate in a data-write cycle in response to the immediately subsequent horizontal scan synchronizing signal $H_{sync}$.

It being assumed that the magnification/reduction-ratio signal VR from the microprocessor 16 is currently indicative of the equal-size reproduction ratio of 1:1, the data-read address generator 30 has already been instructed by the microprocessor 16 to generate the data-read address signal ADR in synchronism with the data-write address generator 26 conditioned to generate the data-write address signal ADW. The data-read address signal ADR thus generated by the data-read address generator 30 is supplied to each of the first memory sections 22a, 22b and 22c of the magnification/reduction line memories 20a, 20b and 20c, respectively. On the other hand, the address selector circuit 44 is responsive to the instruction signal W/R from the microprocessor 16 to pass the data-write address signal ADW from the address generator 26 to the attribute data storage memory 42 as the "X" address signal ADX. Furthermore, the "Y" address generator 48 is conditioned to be read to supply to the attribute data storage memory 42 the "Y" address signal ADY which has been generated by the address generator 48 on the basis of the initial numerical value set in the initial value setting circuit 48a of the signal generator 48 by means of the microprocessor 16 for the equal-size reproduction ratio currently selected.

With the data-read address signal ADR supplied to each of the first memory sections 22a, 22b and 22c of the magnification/reduction line memories 20a, 20b and 20c, respectively, and with the "X" and "Y" address signals ADX and ADY supplied to the attribute data storage memory 42, the image on the image-carrying medium D is duplicated in an equal size on a print sheet (not shown) which has already been loaded into the apparatus. Thus, the image area $A_1$ of the image-carrying medium D is reproduced in colors identical to those of the original with the surrounding background area A blanked out on the print sheet.

Reproduction with Reduction Ratio

It will now be assumed that a reduction ratio of 1:0.5 is selected and entered through suitable signal entry means (not shown) and the use of a reduction ratio is informed from any of the selector switch elements 58 to the microprocessor 16. The attribute data which have been loaded into the attribute data storage memory 42 for the reproduction with the equal-size ratio cab be used without any modification.

When the use of the reduction ratio of 1:0.5 is informed to the microprocessor 16, the microprocessor 16 detects at step S1 shown in the flowchart of FIG. 8 whether or not any of the selector switch elements 58 is closed. Under conditions in which attributes of printing operation are to be selected depending on the nature of the imagecarrying medium to be duplicated, one of the switch elements 8 is closed and accordingly the answer for step S1 is given in the affirmative. In this instance, the microprocessor 16 proceeds to step S2 to transmit the instruction signal W/R to the address selector 44 to select the data-read address generator 30. The microprocessor 16 further transmit the magnification/reduction-ratio signal VR to the data-read address generator 30 to output the latch timing clock pulses CKB in cycles which match the reduction ratio of 1:0.5 as indicated by the waveform "CKB(1/0.5)" in FIG. 3. The dataread address generator 30 is thus conditioned to be operative to output the latch timing clock pulses CKB in cycles longer than the cycles of the system clock pulses CKA. The address selector circuit 44 is in a condition supplying the data-read address signal ADR from the selected signal generator 30 to the attribute data storage memory 42 as the "X" address signal ADX. On the other hand, the "Y" address generator 48 has set in its initial value setting circuit 48a an initial numerical value predetermined for the 1:0.5 reduction ratio and accordingly larger than that used for the equal-size reproduction ratio. From the address generator 48 is thus output the "Y" address signal ADY in cycles equal to those used for the equal-size ratio reproduction as indicated by the waveform "ADY(2/1)" in FIG. 5. The speed of the relative movement between the image sensor 12 and image-carrying medium D being twice higher than that for the equal-size ratio reproduction, the latch circuits 30a, 30b and 30c latch the data representative of the digital light intensity signals $D_R$, $D_G$ and $D_B$ produced during every second cycle of scanning operation. The result is that the image reproduced on a print sheet has its size reduced to one half in each of the horizontal and vertical image scanning directions.

On the other hand, the attribute data read out from the attribute data storage memory 42 are latched at every second "X" address within the latch circuit 46 and supplied to the mode selector 38. Because, in this instance, of the fact that every second "Y" address is designated in the latch circuit 46, the attribute data or edit data stored in the address space $D_1$ of the memory 42 is used for the reproduction of the image area $A_1$ and likewise the attribute data stored in the address space $D_2$ of the memory 42 is used for the reproduction of the background area $A_2$ although the size of the image area $A_1$ of the image-carrying medium D is reduced to one half in each of the horizontal and vertical image scanning directions.

Reproduction with Magnification Ratio

For the reproduction of an original image with a magnification ratio of 1:2, any of the selector switch elements 58 is closed and the magnification ratio selected through the previously mentioned signal entry means (not shown) is informed to the microprocessor 16. The attribute data which have been loaded into the attribute data storage memory 42 for the reproduction with the equal-size ratio can also be used without any modification for the reproduction with a magnification ratio.

With the use of the magnification ratio of 1:0.5 informed to the microprocessor 16, the microprocessor 16 transmits the instruction signal W/R to the address selector 44 to select the data-read address generator 30 and the magnification/ reduction-ratio signal VR to the data-read address generator 30 to output the latch timing clock pulses CKB in cycles which match the magnification ratio of 1:2 as indicated by the waveform "CKB(½)" in FIG. 3. The data-read address generator 30 is thus conditioned to be operative to output the latch timing clock pulses CKB in cycles shorter than the cycles of the system clock pulses CKA.

The address selector circuit 44 is in a condition supplying the data-read address signal ADR from the selected signal generator 30 to the attribute data storage memory 42 as the "X" address signal ADX. On the other hand, the "Y" address generator 48 has set in its initial value setting circuit 48a an initial numerical value predetermined for the 1:2 magnification ratio and accordingly smaller than that used for the equal-size reproduction ratio. From the address generator 48 is thus output the "Y" address signal ADY incremented in response to every second system clock pulse CKA as indicated by the waveform "ADY(½)" in FIG. 5. The speed of the relative movement between the image sensor 12 and image-carrying medium D being one half of that for the equal-size ratio reproduction, the latch circuits 30a, 30b and 30c are enabled to twice latch the data representative of the digital light intensity signals $D_R$, $D_G$ and $D_B$. The result is that the image reproduced on a print sheet has its size doubled in each of the horizontal and vertical image scanning directions.

On the other hand, the attribute data read out from the attribute data storage memory 42 are twice latched in the latch circuit 46 and supplied to the mode selector 38. The attribute data stored in the address space $D_1$ of the memory 42 is thus also used for the reproduction of the image area $A_1$ and likewise the attribute data stored in the address space $D_2$ of the memory 42 is used for the reproduction of the background area $A_2$ although the size of the image area $A_1$ of the image-carrying medium D is doubled in each of the horizontal and vertical image scanning directions.

When the operator of the apparatus manipulates the switch elements 58 to turn off so that the attribute data be established on the basis of the nature of the print sheet to be used, the answer for the step S1 shown in the flowchart of FIG. 8 is given in the negative with the data representing the digital light intensity signals $D_R$, $D_G$ and $D_B$ supplied to the color data processing control circuit 36. Responsive to the instruction signal W/R supplied from the microprocessor 16 as at step S4, the address selector circuit 44 now selects the data-write address generator 26 whereupon, at step S4, the microprocessor 16 establishes in the initial value setting circuit 48a of the "Y" address generator 48 an initial numerical value equal to that used for the equal-size ratio reproduction. Attribute data are thus read out from the attribute data storage memory 42 in a manner similar to that for the equal-size ratio reproduction. If, for example, the image-carrying medium D shown in FIG. 6 is duplicated with its size reduced to one half with the left upper corner of the image-carrying medium as the origin, the portions above and to the left of the image area $A_1$ are duplicated with use of the attribute data stored in the address space $D_2$ of the attribute data storage memory 42 and are accordingly blanked out on the print sheet.

While the read-out address signal ADR and "X" address signal ADX are generated in and supplied from one and the same address generator 30, there may be provided two separate address generators operative to generate and supply such address signals, respectively. Although, furthermore, it has been assumed that the attribute data stored in the attribute data storage memory 42 are those which are prepared specifically for the equal-size ratio reproduction such data may be substituted by any equivalent data prepared for the reproduction with any magnification or reduction ratio.

What is claimed is:

1. An image reading and processing apparatus comprising:
   (a) image data generating means which is operative to optically scan an original image-carrying medium along a predetermined path in a line-by-line manner and, during each cycle of line scanning, generate image data from a line of pixels on the scanned image-carrying medium,
   (b) means for generating a first address signal and a second address signal,
   (c) image data memory means for storing the image data for each line of pixels on the scanned image-carrying medium, the image data memory means being responsive to said first address signal for outputting the image data stored therein,
   (d) an attribute data storage memory having a plurality of addressable memory spaces respectively corresponding to a plurality of small areas into which the entire region of the image-carrying medium can be divided, each of said memory spaces having stored therein attribute data designating the conditions inwhich the image on said image-carrying medium is to be reproduced, said attribute data storage memory being responsive to said second address signal for outputting the attribute data corresponding to the second address signal,
   (e) data processing means for processing the image data output from said image data memory, the data processing means being operative to process the image data on the basis of the attribute data output from said attribute data storage memory,
   (f) means for generating a magnification/reduction-ratio signal indicative of a magnification/reduction ratio at which an image on an image-carrying medium is to be reproduced,
   (g) first timing regulating means responsive to said magnification/reduction-ratio signal for regulating the timings at which said first address signal is to be generated,
   (h) second timing regulating means responsive to said magnification/reduction-ratio signal for regulating the timings at which said second address signal is to be generated, and
   (i) control means for controlling each of said first and second timing regulating means.

2. An image reading and processing apparatus as set forth in claim 1, further comprising (j) means for determining whether both of said first and second timing regulating means are to be operative or only said first regulating means is to be operative with said second regulating means held inoperative.

3. An image reading and processing apparatus comprising:
   (a) image data generating means which is operative to optically scan an original image-carrying medium along a predetermined path in a line-by-line manner and, during each cycle of line scanning, generate image data from a line of pixels on the scanned image-carrying medium,
   (b) image data memory means for storing the image data for each line of pixels on he scanned image-carrying medium and outputting the image data stored therein,
   (c) means for supplying a magnification/reduction ratio at which an image on an image-carrying medium is to be reproduced,
   (d) a first address generator for supplying a data-write address signal to said image data memory means, (e) a second address generator for supplying a data-read address signal to said image data memory means, the second address generator being operative to supply the data-read address signal to said image data memory means at a timing according to the magnification/reduction ratio, (f) an attribute data storage memory having a plurality of addressable memory spaces respectively corresponding to a plurality of small areas into which the entire region of the image-carrying medium is divided, each of said memory spaces having stored therein attribute data designating the conditions in which the image on said image-carrying medium is to be reproduced, said attribute data storage memory being responsive to an attribute data address signal for outputting the attirubte data corresponding to the attribute data address signals, (g) data processing means for processing the image data output from said image data memory, the data processing means being operative to process the image data on the basis of the attribute data output from said attribute data storage memory, and (h) attribute data address supply means for supplying the data-read address signal to said attribute data storage memory as said attribute data address signal.

4. An image reading and processing apparatus as set forth in claim 3, in which said attribute data address supply means is operative to supply either the data-write address signal or the data-read address signal to said attribute data storage memory as said attribute data address signal.

5. An image reading and processing apparatus comprising:

(a) image data generating means which is operative to optically scan an original image-carrying medium along a predetermined path in a line-by-line manner and, during each cycle of line scanning, generate image data from a line of pixels on the scanned image-carrying medium, (b) means for generating a first address signal and a second address signal, (c) image data memory means for storing the image data for each line of pixels on the scanned image-carrying medium, the image data memory means being responsive to said first address signal for outputting the image data stored therein, (d) an attribute data storage memory having a plurality of addressable memory spaces respectively corresponding to a plurality of small areas into which the entire region of the image-carrying medium can be divided, each of said memory spaces having stored therein attribute data designating the conditions inwhich the image on said image-carrying medium is to be reproduced, said attribute data storage memory being responsive to said second address signal for outputting the attribute data corresponding to the second address signal, (e) data processing means for processing the image data output from said image data memory, the data processing means being operative to process the image data on the basis of the attribute data output from said attribute data storage memory, (f) means for generating a magnification/reduction-ratio signal indicative of a magnification/reduction ratio at which an image on an image-carrying medium is to be reproduced, and (g) timing regulating means responsive to said magnification/reduction-ratio signal for regulating the timings at which said first address signal is to be generated.

6. An image reading and processing apparatus comprising:

(a) image data generating means which is operative to optically scan an original image-carrying medium along a predetermined path in a line-by-line manner and, during each cycle of line scanning, generate image data from a line of pixels on the scanned image-carrying medium, (b) means for generating a first address signal and a second address signal, (c) image data memory means for storing the image data for each line of pixels on the scanned image-carrying medium, the image data memory means being responsive to said first address signal for outputting the image data stored therein, (d) an attribute data storage memory having a plurality of addressable memory spaces respectively corresponding to a plurality of small areas into which the entire region of the image-carrying medium can be divided, each of said memory spaces having stored therein attribute data designating the conditions inwhich the image on said image-carrying medium is to be reproduced, said attribute data storage memory being responsive to said second address signal for outputting the attribute data corresponding to the second address signal, (e) data processing means for processing the image data output from said image data memory, the data processing means being operative to process the image data on the basis of the attribute data output from said attribute data storage memory, (f) means for generating a magnification/reduction-ratio signal indicative of a magnification/reduction ratio at which an image on an image-carrying medium is to be reproduced, (g) timing regulating means responsive to said magnification/reduction-ratio signal for regulating the timings at which said first address signal is to be generated, and (h) second timing rgulating means responsive to said first address signal for regulating the timings at which said second address signal is to be generated.

7. An image reading and processing apparatus comprising:

(a) image data generating means which is operative to optically scan an original image-carrying medium along a predetermined path in a line-by-line manner and, during each cycle of line scanning, generate image data from a line of pixels on the scanned image-carrying medium, (b) image data memory means for storing the image data for each line of piexles on the scanned image-carrying medium and outputting the image data stored therein, (c) means for generating a magnification/reduction-ratio signal indicative of a magntification/reduction ratio at which an image on an image-carrying medium is to be reproduced, (d) a first address generator for supplying a data-write address signal to said image data memory means and enabling the image data memory means to store the image data at the address designated by said data-write address signal, (e) a second address generator for generating a data-read address signal on the basis of said magnification/reduction-ratio signal and supplying the data-read signal to said image data memory means and enabling the image data memory means to output the image data at the address designated by said data-read address signal, (f) an attribute data storage memory having a plurality of addressable memory spaces respectively corresponding to a plurality of small areas into which the entire region of the image-carrying medium is divided, each of said memory spaces having stored therein attribute data designating the conditions in which the image on said image-carrying medium is to be reproduced, said attribute data storage memory being responsive to an attribute data address signal for outputting the attribute data corresponding to the attribute data addres signals, (g) data processing means for processing the image data output from said image data memory, the data processing means being operative to process the image data onthe basis of the attribute data output from said attribute data storage memory, and (h) selecting means for selectively coupling one of said first and second address generators to said attribute data storage memory for supplying the data-read address signal to said attribute data storage memory as said attribute data address signal with said second address generator coupled to said attribute data storage memory or supplying the data-write address signal to said attribute data storage memory as said attribute data address signal with said first address generator coupled to said attribute data storage memory.

8. In an image editing apparatus which outputs image date of an original in an editorially modified form, an image editing method comprising the steps:
 establishing edit data for the original when the original is read at the first magnification ratio, wherein said edit data is indicative of the output form of the image data after being modified and is stored in a memory;
 reading the original at the second magnification ratio different from the first magnification ratio;
 fetching said edit data from the memory in synchronization with the reading of the original at the second magnification ratio, and
 editing the image data of the original read at the second magnification ratio on the basis of said edit data fetched from the memory.

9. An image editing method as claimed in claim 8, wherein said reading step comprises the steps are:
 optically scanning the original;
 converting the light image of the original into electrical data, and
 processing the electrical data so as to output digital image data.

10. An image editing method as claimed in claim 9, wherein the magnification ratio is changed optically.

11. In an image editing apparatus which outputs image data of an original in an editorially modified form, an image editing method comprising the steps:
 reading the original at the first magnification ratio;
 establishing edit data for the original read at the first magnification ratio, wherein said edit data is indicative of the output form of the image data after being modified and is stored in a memory;
 reading the original at the second magnification ratio different from the first magnification ratio;
 fetching said edit data from the memory at the speed corresponding to the second magnification ratio, and
 editing the image data of the original read at the second magnification ratio on the basis of said edit data fetched from the memory.

12. An image editing method as claimed in claim 11, wherein said reading step comprises the steps of:
 optically scanning the original;
 converting the light image of the original into electrical data, and
 processing the electrical data so as to output digital image data.

13. An image editing method as claimed in claim 11, wherein the magnification ratio is changed optically.

14. An image editing method as claimed in claim 11, wherein the image data read at the first magnification ratio is stored in an image data memory temporarily, and the image data is fetched from the image data memory in synchronization with fetching the edit data from the memory in order to edit the image data by using the edit data.

* * * * *